(12) United States Patent
Watanabe et al.

(10) Patent No.: US 6,485,826 B1
(45) Date of Patent: Nov. 26, 2002

(54) ADHESIVE SHEET

(75) Inventors: Shunpei Watanabe, Saitama (JP); Takeshi Ikeda, Saitama (JP); Shin Koizumi, Tokyo (JP)

(73) Assignee: Lintec Corporation (JP)

( * ) Notice: Subject to any disclaimer, the term of this patent is extended or adjusted under 35 U.S.C. 154(b) by 32 days.

(21) Appl. No.: 09/723,085

(22) Filed: Nov. 27, 2000

Related U.S. Application Data

(63) Continuation-in-part of application No. 09/052,511, filed on Mar. 31, 1998, now abandoned.

(30) Foreign Application Priority Data

Apr. 8, 1997 (JP) .............................................. 9-105269

(51) Int. Cl.$^7$ .............................................. B32B 27/00
(52) U.S. Cl. .................. 428/343; 428/355 AC
(58) Field of Search ........................... 428/345, 355 AC

(56) References Cited

U.S. PATENT DOCUMENTS 4,913,960 A    4/1990    Kuroda et al.
5,820,957 A   10/1998   Schroeder et al.
5,858,624 A    1/1999   Chou et al.
5,939,189 A    8/1999   Phillips et al.

*Primary Examiner*—Elizabeth M. Cole
(74) *Attorney, Agent, or Firm*—Brinks Hofer Gilson & Lione; G. Peter Nichols

(57) ABSTRACT

An improved adhesive sheet can exhibit an excellent anti-blister characteristic without susceptible to the property of the base material. The adhesive sheet includes a base material that is formed from a base material film and a thin film laminated onto the base material film, an adhesive layer and a release sheet. The adhesive layer contains an adhesive component and a curing component as its main composition. The curing component is of the type that is to be cured by irradiation with radiation. As for such radiation-curing type component, materials containing acrylic-based monomer or oligomer can be used. The adhesive layer has a storage modulus (dynamic modulus) in which a ratio of storage modulus $G_2'/G_1'$ of the adhesive layer lies within the range of 1.2 to 50, wherein $G_1'$ is a storage modulus of the adhesive layer before curing at a temperature of 25° C. and at a frequency of 1 Hz, and $G_2'$ is a storage modulus of the adhesive layer after curing at a temperature of 25° C. and at a frequency of 1 Hz.

15 Claims, 1 Drawing Sheet

ADHESIVE SHEET

RELATED APPLICATIONS

This application is a continuation-in-part of U.S. application Ser. No. 09/052,511 filed Mar. 31, 1998 now abandoned.

BACKGROUND OF THE INVENTION

1. Field of the Invention

This invention relates to an adhesive sheet, and in particular relates to an adhesive sheet, which is used by being stuck onto a display device such as CRT or LCD, for example.

2. Description of the Prior Art

In the conventional display devices such as CRT or LCD, a protective film, which is constructed in the form of an adhesive sheet, is being stuck. Such an adhesive sheet includes a base material film, and the base material film is normally formed of a resin material. In the case where such a base material film is formed of a material such as PET (polyethylene terephthalate), which is likely to generate gas due to decomposition when irradiated with ultraviolet light, a blister will be produced at the adhesive layer due to bubbles of the generated gas.

Further, in recent years, there are known adhesive sheets having a laminated film, which is formed by laminating a thin film on a base material film of the adhesive sheet. Examples of such a laminated film include an AR (anti-reflection) film and a multi-layered film, which is formed by laminating a plurality of thin films made of metal or metal oxide. These laminated films have very low gas-permeability due to existence of the thin film, so that gas generated by decomposition of the base material film or the like is difficult to pass the adhesive layer and then vaporize. With this result, gas which is generated in the adhesive layer or at the boundary surface between the adhesive layer and the base material film is likely to accumulate, and therefore a blister is produced in the adhesive layer due to bubbles of the generated gas.

In order to solve the problem described above, there is known an anti-blister type adhesive sheet, which uses an adhesive component in which a macro-monomer is mixed. This type of adhesive sheet can effectively prevent a blister from being produced in the adhesive layer for the case where only the base material film is provided. However, this adhesive layer can not prevent the formation of such a blister sufficiently for the case where a thin film is laminated on the base material film as described above.

SUMMARY OF THE INVENTION

In view of the above problem, it is an object of the present invention to provide an improved adhesive sheet, which can exhibit an excellent anti-blister characteristic without susceptible to the property of the base material.

In order to achieve the above object, the present invention is directed to an adhesive sheet which comprises a base material; and an adhesive layer which contains, as its main component, an adhesive component and a curing component, wherein the adhesive layer has a storage modulus (dynamic modulus) in which a ratio of storage modulus $G_2'/G_1'$ of the adhesive layer lies within the range of 1.2 to 50, wherein $G_1'$ is a storage modulus of the adhesive layer before curing at a temperature of 25° C. and at a frequency of 1 Hz, and $G_2'$ is a storage modulus of the adhesive layer after curing at a temperature of 25° C. and at a frequency of 1 Hz.

According to the invention as described above, it is possible to provide an adhesive sheet which can exhibit excellent anti-blister effect irrespective of properties of the base material and possess high adhesive strength.

In the present invention, it is preferred that the base material has gas-impermeability. Further, it is also preferred that said base material includes at least one thin film.

Further, in the present invention it is also preferred that the weight-average molecular weight of the adhesive component is 300,000 to 3,000,000. Preferably, the adhesive component contains alkyl esters of acrylic acid or alkyl esters of methacrylic acid as its main composition.

Furthermore, in the present invention, it is preferred that the curing component is the type, which is to be cured by irradiation with radiation. Further, it is preferred that the curing component contains acrylic-based monomer or oligomer. In this case, it is preferred that the acrylic-based monomer or oligomer is a reactive monomer or oligomer, which has acryloyl group.

Moreover, in the present invention, it is also preferred that the amount of the curing component is 0.05 to 50 parts by weight with respect to 100 parts by weight of the adhesive component.

Another aspect of the present invention is directed to an adhesive sheet for use on a display device, comprising:

a base comprising a base film having a first side and a second side opposite to the first side and at least one thin film provided on the first side thereof; and an adhesive layer provided on the second side of said base film for stacking the adhesive sheet onto the display, said adhesive layer containing, as its major component, an adhesive component and a curing component, wherein the adhesive layer has a storage modulus (dynamic modulus) in which a ratio of storage modulus $G_2'/G_1'$ of the adhesive layer lies within the range of 1.2 to 50, wherein $G_1'$ is a storage modulus of the adhesive layer before curing at a temperature of 25° C. and at a frequency of 1 Hz, and $G_2'$ is a storage modulus of the adhesive layer after curing at a temperature of 25° C. and at a frequency of 1 Hz.

According to the invention as described above, it is possible to provide an adhesive sheet which can exhibit excellent anti-blister effect when it is used on a display device irrespective of properties of the base material, and the adhesive sheet possesses high adhesive strength.

The above described and other object, structure and advantage of the present invention will be more apparent when the following description of the preferred embodiment will be considered taken in conjunction with the appended drawing.

DETAILED DESCRIPTION OF THE PREFERRED EMBODIMENTS

Figure 1:
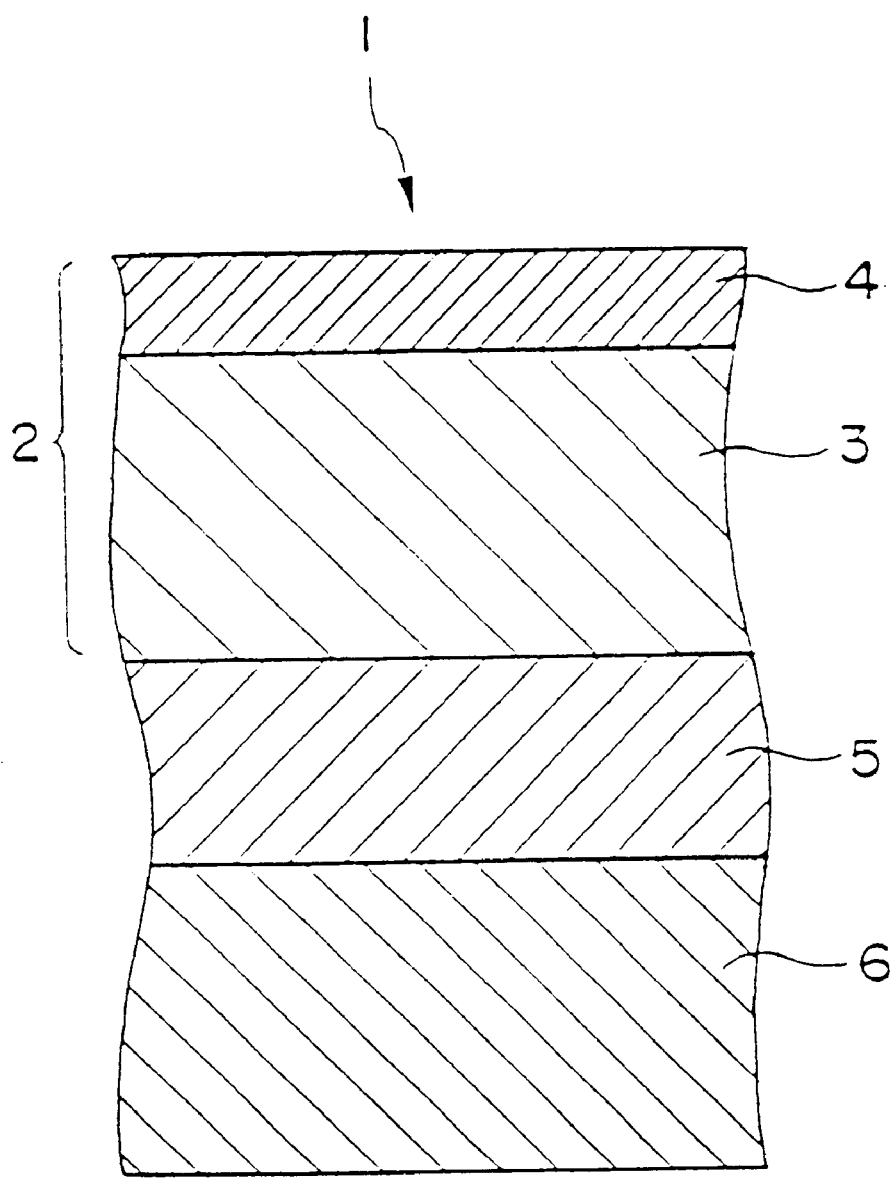
FIG. 1 is a cross-sectional view, which shows a structure of an adhesive sheet according to the present invention.

Hereinafter, preferred embodiments of an adhesive sheet according to the present invention will be described with reference to the appended drawing.

FIG. 1 is a cross-sectional view, which shows a structure of the adhesive sheet according to the present invention. As shown in this figure, the adhesive sheet 1 of the present invention comprises a base material 2, an adhesive layer 5 and a release sheet 6, which is stuck onto the adhesive layer 5 when required.

The base material 2 is constructed from a base material film 3 and a thin film 4. The adhesive layer 5 is formed on the surface of the base material film 3 that is opposite to the other surface on which the thin film 4 is laminated.

Each of these structural elements is described hereinbelow in more detail. The base material film 3 has a function that supports the thin film 4 and the adhesive layer 5. It is preferred that the base material film 3 itself is excellent in dimensional stability with respect to surrounding environmental conditions such as changes in temperature and humidity and the like. Further, it is also preferred that the base material film 3 has flexibility such that the adhesive sheet can exhibit sufficient followability to the curved surface when it is to be stuck to an adherend. Furthermore, it is also preferred that the base material film 3 has properties which are suited for cutting and punching operations in manufacturing process thereof.

As for materials used for the base material film 3, no particular limitation is imposed, but polyester such as polyethylene terephthalate (PET), polybutylene terephthalate (PBT), polyethylene naphthalate (PEN) and the like, and resins such as polyvinyl chloride, polypropylene (PP), polyalylate, polyurethane, polycarbonate, polyamide and the like can be mentioned. Among these materials, PET is particularly preferred as the material for the base material film 3.

However, the base material film 3 of PET has such a property that gas is difficult to permeate. Further, this film is likely to be decomposed when irradiated with ultraviolet light, and it generates. gas when decomposed.

It is preferred that the base material 2 is provided with at least one layer of a thin film 4. As for example of such a thin film 4, it is possible to mention a multi-layered film, which is formed by laminating a plurality of thin films of metal or metal oxide. This multi-layered film is provided on the base material film 3 for the purposes of prevention of reflection of light, and shading, extinction and polarization and the like.

In more details, as an adhesive sheet which aims prevention of reflection of right, there is known an adhesive sheet which is subjected to the AR (anti-reflection) treatment in which thin films, for example, formed of ITO, $SiO_2$, $TiO_2$ and $SiO_2$, respectively, are laminated onto the base material film by means of the vapor formation method such as vapor deposition, sputtering, CVD and the like. If such an adhesive sheet that has been subjected to the AR treatment is attached to a display monitor of an optical device, reflection of rights from a fluorescent lamp and an incandescent lamp and natural right from outside can be prevented, thereby exhibiting glare suppressing effect.

Besides the multi-layered structure as described above, the thin film 4 may be formed into-a single layer structure. In this single layer structure, a metallic thin film formed of Al for example is formed on the base material film.

By forming such a thin film 4 on the base material film 3, the gas permeability of the base material 2 is further lowered, that is the base material 2 substantially becomes to have gas-impermeability. According to the present invention, even in such a case, anti-blister characteristic can be sufficiently maintained.

The adhesive layer 5 comprises an adhesive component and a curing component. Due to the adhesive component contained in the adhesive layer 5, it is possible to obtain a sufficient adhesive strength when it is stuck to an adherend. Further, by adding the curing component into the adhesive layer 5, it is possible to improve cohesive strength further, thereby enabling to obtain strength at a level that will not produce a blister due to gas generated from the base material 2 or the like.

As for examples of the adhesive component, any of rubber-based adhesives, acrylic-based adhesives and silicone-based adhesives can be used. Among these adhesives, the acrylic-based adhesive is particularly preferred since weather resistant property of the adhesive layer 5 can be improved to an excellent level by using such an adhesive.

As for the acrylic-based adhesives which can be mentioned as one of the adhesive components, an acrylic-based adhesive which comprises a low-Tg main monomer which gives stickiness, a high-Tg co-monomer which gives adhesive properties and cohesive strength, and a monomer containing a functional group (monoethylene character unsaturated monomer) which improves crosslinking property and adhesive properties can be used.

As for examples of the main monomer, alkyl esters of acrylic acid such as ethyl acrylate, butyl acrylate, amyl acrylate, 2-ethylhexyl acrylate, octyl acrylate, cyclohexyl acrylate, benzyl acrylate and the like; alkyl esters of methacrylic acid such as butyl methacrylate, 2-ethylhexyl methacrylate, cyclohexyl methacrylate, benzyl methacrylate and the like can be mentioned. In this case, just one of them or a mixture of two or more of them can be selectively used.

As for examples of the comonomer, compounds containing vinyl groups such as vinyl acetate, vinyl propionate, vinyl ether, styrene and the like; compounds containing acryloy groups such as methyl acrylate, acrylonitrile and the like; and compounds containing methacryloy groups such as methyl methacrylate, ethyl methacrylate, methacrylonitrile and the like can be mentioned.

As for examples of the monomer containing a functional group, monomers containing carboxyl groups such as acrylic acid, methacrylic acid, crotonic acid, malelic acid, fumaric acid, itaconic acid and the like; monomers containing hydroxyl groups such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, N-methylol acrylamide, allyl alcohol and the like; monomers containing tertiary amino groups such as dimethyl aminoethyl acrylate, dimethyl aminoethyl methacrylate, diethyl aminoethyl acrylate, diethyl aminoethyl methacrylate, dimethyl aminopropyl acrylate, dimethyl aminopropyl methacrylate and the like; monomers containing amido groups such as acrylamide, methacrylamide and the like; monomers containing N-substituted amido groups such as N-methyl acrylamide, N-methyl methacrylamide, N-ethyl acrylamide, N-ethyl methacrylamide, N-methoxymethyl acrylamide, N-methoxymethyl methacrylamide, N-ethoxymethyl acrylamide, N-ethoxymethyl methacrylamide, N-t-butyl acrylamide, N-octyl acrylamide and the like; and monomers containing epoxy groups such as glycidyl methacrylate and the like can be mentioned.

By using the materials mentioned above, it becomes possible to obtain an adhesive sheet having excellent adhesive strength, cohesive strength and durability. Further, it also becomes possible to obtain appropriate quality and property suited for the purpose of use by selectively changing the type of monomer and combination thereof.

There is no particular limit on the weight-average molecular weight of the adhesive component, but about 300,000 to 3,000,000 is preferred, and 500,000 to 2,000,000 is more preferred. If the molecular weight of the adhesive component is too low, the adhesive strength and cohesive strength of the adhesive are deteriorated, so that it is not possible to obtain a sufficient anti-blister characteristic. On the other hand, if the molecular weight of the adhesive components is too high, the adhesive becomes hard while adhesive strength also becomes insufficient, which results in poor operability at sticking operation.

Further, there is no particular limit on the glass transition point (Tg) of the adhesive component, but −20° C. or less is preferred. If glass transition point exceeds −20° C., there is a case that the adhesive becomes hardened so as not to maintain adhesive property depending on temperatures of the used condition.

The adhesives such as those described above can be used in the forms of both crosslinking and non-crosslinking types. In the case of a crosslinking type, various crosslinking agents such as epoxy-based compounds, isocyanate-based compounds, metal chelate compounds, metal alkoxides, metal salts, amine compounds, hydrazine compounds and aldehyde-based compounds and the like can be used for crosslinking. These crosslinking agents can be selected appropriately in accordance with the types of their functional groups.

As for examples of the curing component contained in the adhesive layer 5, no particular limitation is imposed, but thermosetting resins such as epoxy resin, phenol resin, melamine resin, polyester resin, and resins which are cured by irradiation with radiation as described hereinbelow can be mentioned. Among these resins, the radiation-curing type resins are particularly preferred. According to the radiation-curing type resins, curing process of the curing component can be progressed in a very short time at room temperature or relatively low temperature and therefore operability is good.

Here, "radiation-curing type" means, for example, a type having property in which growth of molecular chain and crosslinking reaction are induced by irradiation with ultraviolet light, laser beams, α rays, β rays, γ rays, X rays and electron beams and thereby its curing component becomes cured.

As for such radiation-curing type component, materials containing acrylic-based monomer or oligomer are preferred, although the present invention is not limited thereto. By using such materials, it is possible to form an adhesive layer having an excellent weather resistant property.

As for examples of such acrylic-based monomer or/and oligomer of the radiation curing type, hexanediol diacrylate, hexanediol dimethacrylate, ethylene glycol diacrylate, ethylene glycol dimethacrylate, propylene glycol diacrylate, propylene glycol dimethacrylate, pentaeryth ritol triacrylate, pentaerythritol trimethacrylate, trimethylolpropane triacrylate, trimethylolpropane trimethacrylate, dipentaerythritol hexaacrylate, dipentaerythritol hexamethacrylate, urethane acrylate, epoxy acrylate, polyester acrylate, and the like can be mentioned. In this case, they may be used alone or in combination of two or more.

Further, it is preferred that the acrylic-based monomer or oligomer contains a reaction type monomer or oligomer having an aclyloyl group, and it is more preferred that it contains two or more aclyloyl groups. By containing two or more aclyloyl groups, formation of net structure can be carried out sufficiently, so that cohesive strength of the adhesive is further improved, thereby enabling to obtain an excellent adhesive layer.

The amount of the curing component such as the above-mentioned radiation curing type component is preferably 0.05 to 50 parts by weight with respect to 100 parts by weight of the above-mentioned adhesive component, and more preferably 0.1 to 20 parts by weight. If the amount of the curing component is too small, there is a case that a suppressing effect which suppresses generation of bubbles due to generated gas and formation of a blister due to the bubbles can not be obtained sufficiently because the cohesive strength of the adhesive is affected. On the other hands, if the amount of the curing component is too much, there is a case that the adhesive layer 5 becomes to hard and thereby lowering the adhesive strength thereof.

When the curing component is blended with the adhesive component, it is preferred for the curing component to use a type having a good compatibility with the adhesive component. In addition, the curing component can be used in the form of copolymer with the main polymer of the adhesive component.

When the curing process of the radiation-curing type component is carried out by irradiation with ultraviolet light or the like, it is preferred for the adhesive layer 5 to have a light permeability. For example, it is preferred that it is substantially transparent or semi-transparent (non-colored or colored). By using such an adhesive layer 5 having the light permeability, curing process of the adhesive layer 5 can be carried out easily.

Further, when the radiation-curing type component is cured by irradiation with ultraviolet light or the like, polymerization initiators can be added. As for examples of such polymerization initiators, benzoins such as benzoin, benzoin methyl ether, benzoin ethyl ether, o-methyl-benzoylbenzoate, p-benzoin ethyl ether, benzoin isopropyl ether, a-methylbenzoin and the like; acetopehnones such as dimethylbenzyl ketal, trichloroacetophenone, 2,2-diethoxyacetophenone, 1-hydroxy cyclohexyl phenyl ketone and the like; propiophenones such as 2-hydroxy-2-methylpropiophenone, 2-hydroxy-4'-isopropyl-2-methylpropiophenone and the like; benzophenones such as benzophenone, methylbenzophenone, p-chlorobenzophenone, p-dimethylaminobenzophenone and the like; thioxanthones such as 2-chlorothioxanthone, 2-ethylthioxanthone, 2-isopropylthioxanthone and the like; benzyl, dibenzosuberone, and a-acyloxym ester and the like can be mentioned.

The amount of such polymerization initiators to be added is preferably about 0.5 to 30 parts by weight with respect to 100 parts by weight of the above-mentioned radiation-curing type component, and more preferably 1 to 20 parts by weight.

On the other hand, when the above-mentioned radiation-curing type component is cured by irradiation with electron beams, it is not necessary to add the polymerization initiators.

In this case, however, the irradiation with electron beams must be carried out under the inert gas atmosphere such as nitrogen gas, since presence of oxygen hinders curing reaction markedly. In this case, it is preferred that the irradiation is carried out under the condition that the release sheet is being stuck to the adhesive layer or under the condition that the adhesive sheet 1 is being stuck to the adherend.

Further, in addition to the above-mentioned polymerization initiators, polymerization accelerators can be used. As for examples of such polymerization accelerators, 4,4'-bis (diethylamine)benzophenone, N-dimethylaminoethyl benzoate, dimethylethanolamine and glycine and the like can be mentioned.

In this case, these polymerization initiators and polymerization accelerators can be added in the form of being microcapsulated in order to improve stability during preservation.

Furthermore, various additives can be added if required, for example ultraviolet ray absorbent material, tackifiers, softening agents (plasticizer), fillers, anti-aging agents, pigments, dies and silane coupling agent and the like.

Examples of such tackifiers include rosin and derivatives thereof, polyterpene, terpene phenol resins, coumarone-indene resins, petroleum-based resins, styrene resins and xylene resins.

Examples of such softening agents include liquid polyether, glycol ester, liquid polyterpene, liquid polyacrylate, phthalic acid esters and trimellitic acid esters and the like.

The adhesive layer 5 described above should preferably have a storage modulus (dynamic modulus) of the following range. Namely, it is preferable that a ratio of storage modulus $G_2'/G_1'$ of the adhesive layer 5 lies within the range of 1.2 to 50, and it is more preferable that a ratio of storage modulus of $G_2'/G_1'$ of the adhesive layer 5 lies within the range of 1.5 to 15 and it is most preferable that a ratio of storage modulus of $G_2'/G_1'$ of the adhesive layer 5 lies within the range of 1.5 to 6. Here, $G_1'$ is a storage modulus of the adhesive layer 5 before curing at a temperature of 25° C. and at a frequency of 1 Hz, and $G_2'$ is a storage modulus of the adhesive layer 5 after curing at a temperature of 25° C. and at a frequency of 1 Hz. If the ratio of $G_2'/G_1'$ is lower than the lower limit value described above, there arises a case that anti-blister effect that is effect for suppressing blister generated at the adhesive layer due to bubbles of the generated gas can not be obtained sufficiently. On the other hand, if the ratio of $G_2'/G_1'$ exceeds the above upper limit value, the adhesive strength of the adhesive layer 5 tends to be lowered.

In this connection, it is to be noted that in this specification "the storage modulus at a temperature of 25° C. and at a frequency of 1 Hz" is measured by using a dynamic viscoelasticity measuring apparatus named as "DINAMIC ANALYZER RDA II" which is a product name (trademark) of Rheometrics Scientific, Inc. Specifically, "the storage modulus at a temperature of 25° C. and at a frequency of 1 Hz" means a value calculated from searing storage modulus measured by using parallel discs of the storage modulus measuring apparatus under the condition of a temperature of 25° C. and a frequency of 1 Hz. The temperature of 25° C. and the frequency of 1 Hz are determined based on the judgment that they are considered to be the most suitable condition in view of the purpose of use and the using environment of the adhesive sheet of the present invention.

As for examples of methods of forming the adhesive layer 5 which contains the adhesive component and the curing component as its main component as described above, a transfer applying method or a directly applying method using a dye or a blade-coater or the like. Further, as for the methods for the application, a flow-coating method, a knife-coating method, a roll-coating method, and dipping and the like can be mentioned.

No particular limitation is imposed upon the thickness (dry film thickness) of the adhesive layer 5, but the thickness of the adhesive layer 5 is preferably about 5 to 100 μm, and more preferably about 10 to 60 μm.

Any available release sheets can be used as the release sheet 6 for use in the adhesive sheet of the present invention. For example, it is possible to use a release sheet in which a releasable type coating layer such as a silicone layer is formed on the sticking surface, which is to be attached to the adhesive layer 5 of the base material. As for examples of the base materials which can be used for such a release sheet 6, a paper material such as glassine paper, and a resin film formed of polyethylene, polypropylene or polyester or the like can be mentioned.

Purpose of use of the adhesive sheet 1 of the present invention (excepting the release sheet 6) is not limited to a specific use. However, it is preferred that the adhesive sheet is formed into a substantially transparent or semi-transparent sheet when it is required to have light permeability. In this way, visibility will not be deteriorated, even when the light sheet is stuck to a display of an optical equipment or a window of a vehicle.

In the above, the adhesive sheet of the present invention is described with reference to the embodiment shown in the drawing, but it goes without saying that the present invention is not limited to the embodiment. For example, the adhesive sheet of the present invention further includes, depending on the purpose of use, one or more functional films laminated thereon. Further, in each of the base material film 3, the thin layer 4 and the adhesive layer 5, an additional layer(s) may be provided optionally.

Hereinbelow, the practical examples of the present invention will be described.

EXAMPLE 1

1. Manufacture of the Adhesive Sheet

A base material which is formed from a polyethylene terepthalate (PET) film on which an anti-reflection preventing layer (AR layer) is laminated was prepared. Then, on one surface of the base material that is opposite to the AR layer, an adhesive layer was formed using an adhesive solution, which was prepared by mixing the components mentioned in the following (2).

Thereafter, a release sheet was attached to the adhesive layer to obtain an adhesive sheet shown in FIG. 1.

The components and the structure of the respective layers were as follows.

(1) Base Material (AR-PET film)
  Base Material Film: polyethylene terepthalate (PET) film (thickness: 188 μm)
  AR layer: Four layer structure in which four layers formed of ITO, $SiO_2$, $TiO_2$ and $SiO_2$ respectively, are laminated by means of sputtering (Total thickness: 0.2 μm).
(2) Adhesive Layer
  Adhesive component:
    100 parts by weight of acrylic acid ester-based copolymers (Mw=600,000), which contains 95 parts by weight of butyl acrylate and 5 parts by weight of acrylic acid.
  Curing components:
    5 parts by weight of trimethylolpropane triacrylate monomer with respect to the amount of the adhesive component:
  Additives:
    (i) Photo polymerization initiator: 0.6 parts by weight of: 1-hydroxy cyclohexyl phenyl ketone with respect to the amount of the adhesive component.
    (ii) Crosslinking agent: 1 parts by weight of trimethylolpropane tolylene diisocyanate with respect to the amount of the adhesive component.
  Thickness: 25 μm
(3) Release Sheet
  Base material: Transparent polyester film in which silicone is treated on one side (SP PET38, made by Lintec Corporation)
  Thickness: 38 μm A sheet formed from the above elements were irradiated with ultraviolet light from the side of the release sheet and then it was subjected to an aging for one week at room temperature to obtain an adhesive sheet.

EXAMPLE 2

An adhesive sheet was obtained in the same way as in Example 1 except that the curing component was penta erythritol triacrylate.

EXAMPLE 3

An adhesive sheet was obtained in the same way as in Example 1 except that the curing component was dipenta erythritol hexacrylate.

EXAMPLE 4

An adhesive sheet was obtained in the same way as in Example 1 except that the weight-average molecular weight [Mw] of acrylic acid ester-based copolymers used as the adhesive components was 1,200,000.

EXAMPLE 5

An adhesive sheet was obtained in the same way as in Example 1 except that photo polymerization initiator was not added, and irradiation with electron beams was carried out instead of ultraviolet light.

EXAMPLE 6

An adhesive sheet was obtained in the same way as in Example 1 except that a PET film having no thin film is used instead of the AR-PET film used in Example 1.

Comparative Example 1

An adhesive sheet was obtained in the same way as in Example 1 except that the curing component and the photo polymerization initiator were not added.

Comparative Example 2

An adhesive sheet was obtained in the same way as in Example 4 except that the curing component and the photo polymerization initiator were not added.

Comparative Example 3

An adhesive sheet was obtained in the same way as in Example 1 except that the composition of the adhesive layer was changed as follows.
Adhesive component:
  100 part by weight of acrylic acid ester-based copolymers (Mw=600,000) which contains 94 parts by weight of butyl acrylate and 5 parts by weight of acrylic acid and 1 parts by weight of methyl methacrylate macromonomer (AA-6, made by Toa Gosei Co., Ltd.) with respect to the amount of the adhesive component.
Additives:
  Crosslinking agent: 1 parts by weight of trimethylolpropane tolylene diisocyanate with respect to the amount of the adhesive component.
Thickness: 25 μm

Comparative Example 4

An adhesive sheet was obtained in the same way as in Comparative Example 3 except that the weight-average molecular weight [Mw] of acrylic acid ester-based copolymer, which is used as the adhesive component in Comparative Example 3 was 1,200,000.

Comparative Example 5

An adhesive sheet was obtained in the same way as in Example 6 except that the curing component and the photo polymerization initiator used in Example 6 were not added.

Comparative Example 6

An adhesive sheet was obtained in the same way as in Example 1 except that 0.04 parts by weigh of the curing component and 0.01 parts by weight of the photo polymerization initiator were added to the composition in Example 1.

Comparative Example 7

An adhesive sheet was obtained in the same way as in Example 1 except that 60 parts by weigh of difunctional urethane acrylate having a molecular weight of 10000 as the curing component and 5 parts by weight of the photo polymerization initiator were added to the composition in Example 1.

2. Test for Properties of the Adhesive Layer

For each of the adhesive sheets obtained by Examples 1–6 and Comparative Examples 1–7, a storage modulus of the adhesive layer thereof was measured by utilizing the parallel discs of the dynamic viscoelasticity measuring apparatus named as "DINAMIC ANALYZER RDA II" of Rheometrics Scientific, Inc under the condition of a temperature of 25° C. and a frequency of 1 Hz. Specifically, under the condition, the storage modulus $G_1'$ which is a storage modulus before irradiation of ultraviolet ray (before curing) and the storage modulus $G_2'$ which is a storage modulus after irradiation of ultraviolet ray (after curing) of the adhesive layer of each adhesive sheet were measured to obtain the ratio of storage modulus $G_2'/G_1'$ of the adhesive layer of each adhesive sheet. The results of the test are shown in the following Table 1.

3. Test for Anti-blister Characteristic of Adhesive Layer

The adhesive sheets obtained by Examples 1–6 and Comparative Examples 1–7 were stuck to curved glass plates, respectively, and then they were undergone a durability test using a feed meter, and then degrees of productions of blisters were observed by eyes. The results of the test are shown in the following Table 1. In this test, the testing conditions by the feed meter was the same as those that are determined by JIS B 7751.

In this connection, it is to be noted that the anti-blister characteristic could not be evaluated for the Comparative Example 7 since the adhesive sheet of this Example was partially peeled off during the test due to poor adhesive strength of the adhesive layer of the adhesive sheet.

The assessment standards for the blisters were as follows.
  ○: In the adhesive layer, no bubble was generated and therefore no blister was produced.
  Δ: In the adhesive layer, extremely small bubbles were generated.
  X: In the adhesive layer, bubbles were generated.
  XX: In the adhesive sheet layer, a blister was produced.

TABLE 1

|  | $G_2'$ (dyne/cm²) | $G_2'/G_1'$ | Feed Meter: for 150 hours |
|---|---|---|---|
| Example 1 | $1.8 \times 10^6$ | 2.0 | ○ |
| Example 2 | $1.8 \times 10^6$ | 2.0 | ○ |
| Example 3 | $2.0 \times 10^6$ | 2.1 | ○ |
| Example 4 | $2.2 \times 10^6$ | 2.2 | ○ |
| Example 5 | $1.8 \times 10^6$ | 2.0 | ○ |
| Example 6 | $1.8 \times 10^6$ | 2.0 | ○ |
| Compar. Ex. 1 | $5.8 \times 10^5$ | 1.0 | XX |
| Compar. Ex. 2 | $2.0 \times 10^6$ | 1.0 | XX |
| Compar. Ex. 3 | $1.9 \times 10^6$ | 1.0 | X |
| Compar. Ex. 4 | $2.0 \times 10^6$ | 1.0 | X |
| Compar. Ex. 5 | $1.8 \times 10^6$ | 1.0 | Δ |
| Compar. Ex. 6 | $6.2 \times 10^5$ | 1.1 | X |
| Compar. Ex. 7 | $1.4 \times 10^8$ | 270 | — |

As seen from the results shown in Table 1, the respective adhesive sheets of Examples 1–6 exhibit excellent followability to the curved surface and excellent adhesive strength. Further, no blister that is to be produced by gas generated from the base material was seen in spite of the facts that they were being put under severe conditions.

In contrast with these Examples, generation of gas and formation of blisters by the generated gas were observed in the adhesive sheets of Comparative Examples 1–6. Further, the adhesive sheet of Comparative Example 7 exhibits poor adhesive strength, and therefore the adhesive sheet is peeled off due to elapse of a long time or large temperature changes.

In addition, these adhesive sheets were being left under the dry condition at a temperature of 70° C. for 500 hours without irradiation of light and under RH 90% condition at a temperature of 60° C. for 500 hours without irradiation of light, and then conditions of the respective sheets were observed. As a result, no generation of bubbles and formation of blisters were observed in each of Examples 1–6, and they seemed to be very excellent conditions.

As described in the above, the adhesive sheet according to the present invention has an adhesive layer which is rigid and rich in cohesive strength. Therefore, even if the adhesive sheet is provided with a thin film and thereby gas permeability is lowered, it is possible to sufficiently exhibit a blister preventing effect (anti-blister effect), which prevents formation of a blister that is likely to be produced by gas generated from the base material.

Further, since the adhesive sheet of the present invention has excellent adhesive strength, it exhibits an excellent adhesive characteristic and it will not be deteriorated due to elapse of time after it is attached to an adhered. In particular, even if the adherend has a curved surface such as a cathode-ray tube (CRT), the adhesive sheet according to the present invention exhibits an excellent followability to the curved surface, and thereby exhibiting excellent adhesive strength. In addition, even if a large temperature change would occur in the using environment of the adhesive sheet, no peeling off is occur and reliable adhesivity can be maintained.

Finally, it is to be understood that the present invention is not limited to the above Embodiment and Examples and the scope of the invention will be determined by the following claims.

What is claimed is:

1. An adhesive sheet, comprising:
    a base material; and
    an adhesive layer which contains, as its main component, an adhesive component and a curing component, wherein the adhesive layer has as its main composition a component selected from the group consisting of alkyl esters of acrylic acid, alkyl esters of methacrylic acid, and mixtures thereof and wherein the adhesive layer has a storage modulus (dynamic modulus) in which a ratio of storage modulus $G_2'/G_1'$ of the adhesive layer lies within the range of 1.2 to 50, wherein $G_1'$ is a storage modulus of the adhesive layer before curing at a temperature of 25° C. and at a frequency of 1 Hz, and $G_2'$ is a storage modulus of the adhesive layer after curing at a temperature of 25° C. and at a frequency of 1 Hz.

2. The adhesive sheet as claimed in claim 1, wherein said base material has gas-impermeability.

3. The adhesive sheet as claimed in claim 1, wherein said base material includes at least one thin film.

4. The adhesive sheet as claimed in claim 1, wherein the weight-average molecular weight of the adhesive component is 300,000 to 3,000,000.

5. The adhesive sheet as claimed in claim 1, wherein the curing component is the type, which is to be cured by irradiation with radiation.

6. The adhesive sheet as claimed in claim 1, wherein the curing component contains acrylic-based monomer or oligomer.

7. The adhesive sheet as claimed in claim 6, wherein the acrylic-based monomer or oligomer is a reactive monomer or oligomer, which has acryloyl group.

8. The adhesive sheet as claimed in claim 1, wherein the amount of the curing component is 0.05 to 50 parts by weight with respect to 100 parts by weight of the adhesive component.

9. An adhesive sheet for use on a display device, comprising:
    a base comprising a base film having a first side and a second side opposite to the first side and at least one thin film provided on the first side thereof; and
    an adhesive layer provided on the second side of said base film for stacking the adhesive sheet onto the display, said adhesive layer containing, as its major component, an adhesive component and a curing component, wherein the adhesive layer has as its main composition a component selected from the group consisting of alkyl esters of acrylic acid, alkyl esters of methacrylic acid, and mixtures thereof and wherein the adhesive layer has a storage modulus (dynamic modulus) in which a ratio of storage modulus $G_2'/G_1'$ of the adhesive layer lies within the range of 1.2 to 50, wherein $G_1'$ is a storage modulus of the adhesive layer before curing at a temperature of 25° C. and at a frequency of 1 Hz, and $G_2'$ is a storage modulus of the adhesive layer after curing at a temperature of 25° C. and at a frequency of 1 Hz.

10. The adhesive sheet as claimed in claim 9, wherein said at least one thin film includes two or more thin films of metal or metal oxide.

11. The adhesive sheet as claimed in claim 9, wherein the weight-average molecular weight of the adhesive component is 300,000 to 3,000,000, and the glass transition point (Tg) of the adhesive component is equal to or less than −20° C.

12. The adhesive sheet as claimed in claim 9, wherein said adhesive layer contains polymerization initiator.

13. The adhesive sheet as claimed in claim 12, wherein the amount of the polymerization initiator is 0.5 to 30 parts by weight with respect to 100 parts by weight of the curing component.

14. The adhesive sheet as claimed in claim 9, wherein the adhesive layer has a cohesive strength having such a degree that can prevent formation of a blister in the adhesive layer even when gas is generated from the base film under the condition that the adhesive sheet is being stuck onto the display device.

15. The adhesive sheet as claimed in claim 9, wherein the curing component containing an acrylic-based monomer or oligomer having two or more acrlyloyl group so that the adhesive layer forms a net structure.

* * * * *